US010203681B2

(12) United States Patent
Amano

(10) Patent No.: US 10,203,681 B2
(45) Date of Patent: Feb. 12, 2019

(54) SEQUENCE-PROGRAM-CREATION SUPPORTING APPARATUS

(71) Applicant: Mitsubishi Electric Corporation, Tokyo (JP)

(72) Inventor: Hirofumi Amano, Aichi (JP)

(73) Assignee: Mistubishi Electric Corporation, Chiyoda-ku, Tokyo (JP)

(*) Notice: Subject to any disclaimer, the term of this patent is extended or adjusted under 35 U.S.C. 154(b) by 378 days.

(21) Appl. No.: 15/025,984

(22) PCT Filed: Nov. 20, 2013

(86) PCT No.: PCT/JP2013/081304
§ 371 (c)(1),
(2) Date: Mar. 30, 2016

(87) PCT Pub. No.: WO2015/075790
PCT Pub. Date: May 28, 2015

(65) Prior Publication Data
US 2016/0246279 A1 Aug. 25, 2016

(51) Int. Cl.
G05B 19/05 (2006.01)
(52) U.S. Cl.
CPC .......... G05B 19/056 (2013.01); G05B 19/05 (2013.01); G05B 2219/13004 (2013.01); G05B 2219/13144 (2013.01)
(58) Field of Classification Search
CPC .................. G05B 19/05; G05B 19/056; G05B 2219/13004; G05B 2219/13144;
(Continued)

(56) References Cited

U.S. PATENT DOCUMENTS 7,949,422 B1* 5/2011 Little .................. G05B 19/056
700/17
8,406,903 B2 3/2013 Mitamura et al.
(Continued)

FOREIGN PATENT DOCUMENTS

CN 1734381 A 2/2006
JP 04-032905 A 2/1992
(Continued)

OTHER PUBLICATIONS

Communication dated Nov. 13, 2017 from the State Intellectual Property Office of the P.R.C. In counterpart Application No. 201380081106.2.
(Continued)

Primary Examiner — Peniel M Gumedzoe
(74) Attorney, Agent, or Firm — Sughrue Mion, PLLC; Richard C. Turner

(57) ABSTRACT

A sequence-program-creation supporting apparatus includes a storing unit in which dedicated command information including a command name of a dedicated command executable by a programmable logic controller applicable to a control system is stored for each of models of the programmable logic controller and a screen display unit that reads out, when detecting that operation for inputting the dedicated command is performed on a sequence-program creation screen, from the storing unit, the dedicated command information corresponding to a model of the programmable logic controller configuring the control system, and displays command names of dedicated commands in list on the basis of the dedicated command information read out from the storing unit.

7 Claims, 8 Drawing Sheets

(58) Field of Classification Search
CPC ......... G05B 2219/23258; G05B 2219/32147; G05B 2219/32155; G05B 2219/36043
See application file for complete search history.

(56) References Cited

U.S. PATENT DOCUMENTS

| | | | |
|---|---|---|---|
| 2002/0059567 A1* | 5/2002 | Minamide | G06F 8/51 717/151 |
| 2005/0038528 A1* | 2/2005 | McKelvey | G05B 19/054 700/17 |
| 2005/0228517 A1 | 10/2005 | Tomita | |
| 2006/0116777 A1* | 6/2006 | Dax | G05B 19/056 700/18 |
| 2009/0030951 A1 | 1/2009 | Morita | |

FOREIGN PATENT DOCUMENTS

| | | |
|---|---|---|
| JP | 05-080814 A | 4/1993 |
| JP | 06-187015 A | 7/1994 |
| JP | 2002-229612 A | 8/2002 |
| JP | 2004-259084 A | 9/2004 |
| JP | 2005-327263 A | 11/2005 |
| JP | 2007-299205 A | 11/2007 |
| JP | 2007-310571 A | 11/2007 |
| JP | 2009-098939 A | 5/2009 |
| JP | 2011-028562 A | 2/2011 |
| WO | 2007/102313 A1 | 9/2007 |
| WO | 2008/146380 A1 | 12/2008 |

OTHER PUBLICATIONS

Taiwanese Office Action issued in TW 103108611 dated Aug. 5, 2015.
International Search Report of PCT/JP2013/081304 dated Feb. 4, 2014.
Communication dated Jul. 23, 2018, from the State Intellectual Property Office of People's Republic of China in counterpart Application No. 201380081106.2.

* cited by examiner

FIG.4

| No. | COMMAND NAME | CONTENT | CONTROL DATA | | CONTROL DATA | | ... |
|---|---|---|---|---|---|---|---|
| | | | ITEM NAME | SETTING RANGE | ITEM NAME | SETTING RANGE | |
| 1 | GP.READ | READOUT OF DEVICE | TARGET STATION NUMBER | 1 TO 120 | DATA SIZE | 1 TO 960 | ... |
| 2 | GP.WRITE | WRITING OF DEVICE | TARGET STATION NUMBER | 1 TO 120 | DATA SIZE | 1 TO 960 | ... |
| ... | | | | | | | |

SEQUENCE-PROGRAM-CREATION SUPPORTING APPARATUS

CROSS REFERENCE TO RELATED APPLICATIONS

This is a National Stage of International Application No. PCT/JP2013/081304 filed Nov. 20, 2013, the contents of which are incorporated herein by reference in its entirety.

FIELD

The present invention relates to a sequence-program-creation supporting apparatus that facilitates creation work of a sequence program for controlling a programmable logic controller.

BACKGROUND

A control system is configured by a programmable logic controller (also referred to as programmable controller) and an extension unit such as a network unit. The programmable logic controller and the extension unit are controlled by a sequence program.

The sequence program is created by an engineering tool, which is a sequence-program-creation supporting apparatus. When the sequence program causes the programmable logic controller and the extension unit to execute processing, a command specific to an apparatus defined in advance (hereinafter referred to as dedicated command) is described in the sequence program.

The dedicated command is configured by a command name and control data. The control data is stored in a device in the programmable logic controller. The programmable logic controller and the extension unit execute the processing on the basis of setting values stored in the device.

Patent Literature 1 discloses a program-creation supporting apparatus that acquires system configuration information of an extension unit connected to a CPU unit (Central Processing Section module), sets, on the basis of information concerning a type of the extension unit, as a search target, a command word for instructing operation of a controlled apparatus connected to the extension unit, and extracts and displays a command word corresponding to a character string of an input command. Patent Literature 2 discloses a programming apparatus for a programmable controller with which an operator performs input operation according to guidance to create a sequence program. Patent Literature 3 discloses a control-program creating apparatus with which an operator inputs, on an editing screen of a control program displayed in a ladder format, to add device designation, an input box of a command or a memory address for designating a device and an input box of a device comment to display a ladder diagram with the device comment. Patent Literature 4 discloses a control-system engineering apparatus that reads out system configuration information and a status from project information of a PLC (Programmable Logic Controller) and comprehends a network to be connected.

CITATION LIST

Patent Literature

Patent Literature 1: Japanese Patent Application Laid-Open No. 2011-28562

Patent Literature 2: Japanese Patent Application Laid-Open No. H5-80814

Patent Literature 3: Japanese Patent Application Laid-Open No. 2007-299205

Patent Literature 4: International Publication No. 2008/146380

SUMMARY

Technical Problem

Conventionally, when control data of a dedicated command is set, an operator who creates a sequence program needs to manually create a program for storing setting values into devices of a programmable logic controller. When an unskilled operator creates a sequence program, there is a problem in that the creation takes time because of errors of setting values and/or errors of a program in which such setting is omitted.

Devices in which control data is stored are desirably not to be used in uses other than the control data storage. It is necessary to clearly indicate that the devices are for the control data storage. As means for clearly indicating the use of the devices, there is a method of adding a device comment (allocating a character string to each of the devices). However, there is a problem in that it takes time to manually add a comment to each of the devices.

The invention disclosed in Patent Literature 1 does not display all usable commands corresponding to a unit. Therefore, when an un-extracted command word is input, creation of a program is not supported. The invention disclosed in Patent Literature 2 does not disclose anything about automatically inputting comments (device comments) input to a sequence program together with devices. In the invention disclosed in Patent Literature 3, because an operator himself/herself inputs commands and memory addresses for designating devices, it is likely that an error occurs in setting. The invention disclosed in Patent Literature 4 does not disclose anything about acquiring configuration information of extension units and displaying a list of command words corresponding to relevant extension units.

The present invention has been devised in view of the above and it is an object of the present invention to obtain a sequence-program-creation supporting apparatus that facilitates operation of a device that stores a dedicated command described in a sequence program and control data of the dedicated command.

Solution to Problem

There is provided a sequence-program-creation supporting apparatus according to an aspect of the present invention that supports work for creating a sequence program that a programmable logic controller configuring a control system is caused to execute, the sequence-program-creation supporting apparatus including: a storing unit in which dedicated command information including a command name of a dedicated command, which is executable by the programmable logic controller applicable to the control system, is stored for each of models of the programmable logic controller; dedicated-command-information reading out unit that reads out, when detecting that operation for inputting the dedicated command is performed on a sequence-program creation screen, from the storing section, the dedicated command information corresponding to a model of the programmable logic controller configuring the control system; and dedicated-command-list displaying unit that displays command names of dedicated commands in list on the basis of the dedicated command information read out from the storing section.

Advantageous Effects of Invention

The sequence-program-creation supporting apparatus according to the present invention facilitates description of the dedicated command in the sequence program creation. Therefore, there is an effect that even an unskilled operator can easily create an accurate sequence program.

BRIEF DESCRIPTION OF DRAWINGS

FIG. 4 is a diagram showing a data structure example of a command information table.

DESCRIPTION OF EMBODIMENTS

An embodiment of a sequence-program-creation supporting apparatus according to the present invention is explained in detail below with reference to the drawings. Note that the present invention is not limited by the embodiment.

EMBODIMENT

Figure 1:
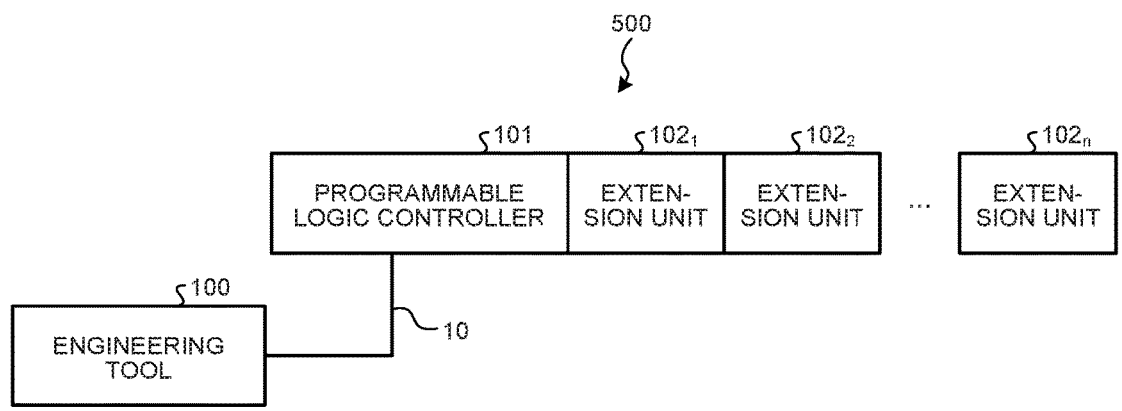
FIG. 1 is a diagram showing a state of use of an embodiment of a sequence-program-creation supporting apparatus according to the present invention.

FIG. 1 is a diagram showing a state of use of an embodiment of a sequence-program-creation supporting apparatus according to the present invention. An engineering tool 100 functioning as the sequence-program-creation supporting apparatus is connected to a programmable logic controller (a CPU unit) 101 by a transmission line 10. A plurality of extension units $102_1$, $102_2$, . . . , and $102_n$ are connected to the programmable logic controller 101. The programmable logic controller 101 and the extension units $102_1$, $102_2$, . . . , and $102_n$ configure a control system 500. Note that a configuration in which the plurality of extension units $102_1$, $102_2$, . . . , and $102_n$ are connected to the programmable logic controller 101 is described as an example. However, the number of extension units only has to be one or more.

Figure 2:
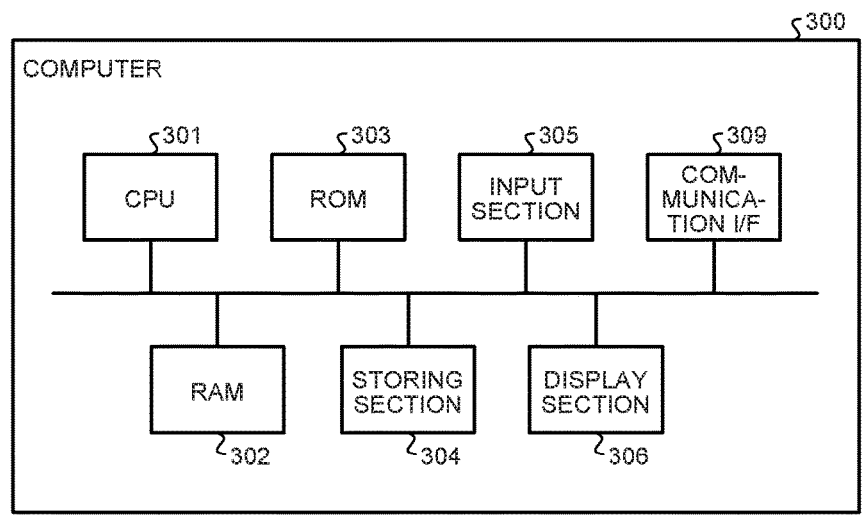
FIG. 2 is a diagram showing the hardware configuration of a computer that executes engineering tool software.

The engineering tool 100 is configured by installing engineering tool software in a general-purpose computer. FIG. 2 is a diagram showing the hardware configuration of a computer that executes the engineering tool software. A computer 300 includes a CPU (Central Processing Section) 301, a RAM (Random Access Memory) 302, a ROM (Read Only Memory) 303, a storing section 304, an input section 305, a display section 306, and a communication I/F (Interface) 309.

The CPU 301 is an arithmetic section that executes the engineering tool software. The RAM 302 is a work area used by the CPU 301 in executing a program. The ROM 303 stores, in a nonvolatile manner, a program (an Initial Program Loader (IPL), etc.) executed by the CPU 301 at a time of starting the computer 300. The storing section 304 is a device that stores information in a nonvolatile manner. A hard disk drive, a solid state drive, and the like can be applied as the storing section 304. The input section 305 is a user interface for an operator to input information. A pointing device (a mouse, a touch panel, etc.), a keyboard, and the like can be applied as the input section 305. The display section 306 is a device that displays information. An LCD (Liquid Crystal Display), an OLED (Organic Light Emitting Display), and the like can be applied as the display section 306. The communication I/F 309 is an interface for communicating with the programmable logic controller 101 through the transmission line 10.

Figure 3:
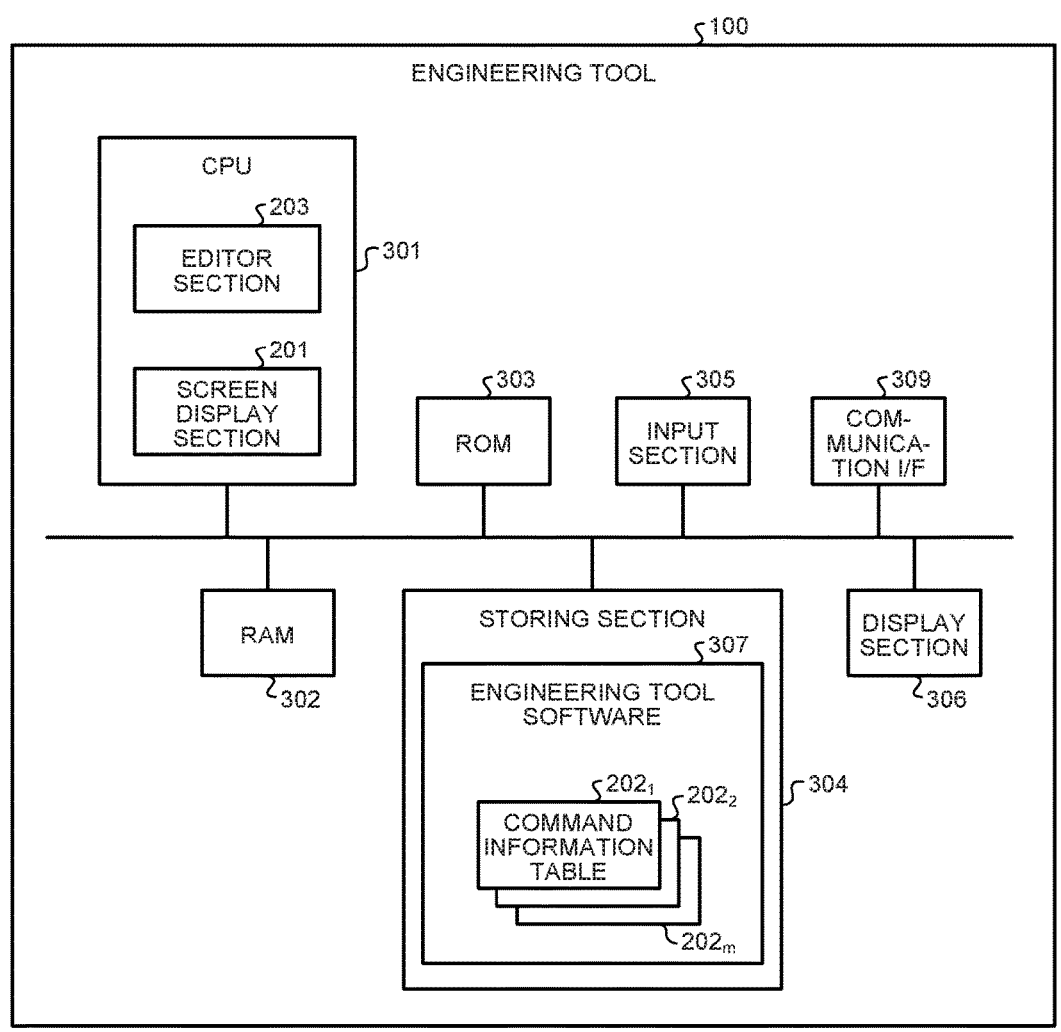
FIG. 3 is a diagram showing a computer functioning as an engineering tool.

The engineering tool software installed in the computer 300 is stored in the storing section 304. The CPU 301 reads out and executes engineering tool software 307 stored in the storing section 304, whereby the computer 300 transits to a state in which the computer 300 is functioning as the engineering tool 100. FIG. 3 is a diagram showing the computer functioning as the engineering tool. In the engineering tool 100, an editor section 203 and a screen display section 201 are generated on the CPU 301. Command information tables $202_1$ to $202_m$ are included in the engineering tool software 307 stored in the storing section 304. As each of the command information tables $202_1$ to $202_m$, one table corresponds to each of models of the programmable logic controller 101 and the extension units $102_1$, $102_2$, . . . , and $102_n$. That is, as the command information tables $202_1$ to $202_m$, one table is prepared for each of the model of the programmable logic controller 101 and the extension units $102_1$, $102_2$, . . . , and $102_n$. Note that, in the following explanation, when the command information tables $202_1$ to $202_m$ are generally indicated, the command information tables $202_1$ to $202_m$ are referred to as command information table 202.

The editor section 203 causes the display section 306 to display a sequence-program creation screen and performs, according to operation of the operator performed on the input section 305, processing for creating and editing a sequence program. The function of the editor section 203 is the same as an editor function of a general engineering tool.

The screen display section 201 causes, referring to the command information table 202 in the storing section 304, the display section 306 to display various windows for supporting an input of a dedicated command on the program creation screen. Note that details of the various windows for supporting an input of a dedicated command are explained below. The screen display section 201 communicates with the programmable logic controller 101 through the communication I/F 309 and the transmission line 10 and acquires information (e.g., model numbers) for specifying models of the programmable logic controller 101 and the extension units $102_1$, $102_2$, . . . , and $102_n$.

FIG. 4 is a diagram showing a data structure example of the command information table. The command information table 202 includes columns of a command name 30, content 31, and control data $32_1$, $32_2$, . . . . The control data $32_1$, $32_2$, . . . respectively include columns of item names $32a_1$, $32a_2$, . . . and setting ranges $32b_1$, $32b_2$ . . . . That is, dedicated command information configuring each record of the command information table 202 is configured by combining the command name 30, the content 31, and the control data $32_1$, $32_2$, . . . . The command name 30 is a character string indicating a name set in advance in a dedicated command. When the dedicated command is displayed on the sequence-program creation screen, the character sting set as the command name 30 is displayed. The content 31 is a character string representing processing content of the dedicated command. The content 31 is set by a creator of the command information table 202 (e.g., a vendor of the engineering tool software 307). The control data $32_1$, $32_2$, . . . are information (arguments) necessary in executing the dedicated command. The item names $32a_1$, $32a_2$, . . . are character strings representing a meanings of respective control data (what the control data defines as a value). The item names $32a_1$, $32a_2$, . . . are defined by the creator of the command information table 202. The setting ranges $32b_1$, $32b_2$, . . . represent ranges of values that the respective control data $32_1$, $32_2$, . . . can take.

Note that, when the control system 500 is connected to another system through a network during actual use, a station name for specifying the system on the network is allocated to the control system 500. Therefore, in FIG. 4, a character string of a target station number set in the item name $32a_1$ means that the target station number is control data used for specifying a communication counterpart when the programmable logic controller 101 communicates with another system on the network. Note that a station number of an own station could be set as the target station number.

Figure 5:
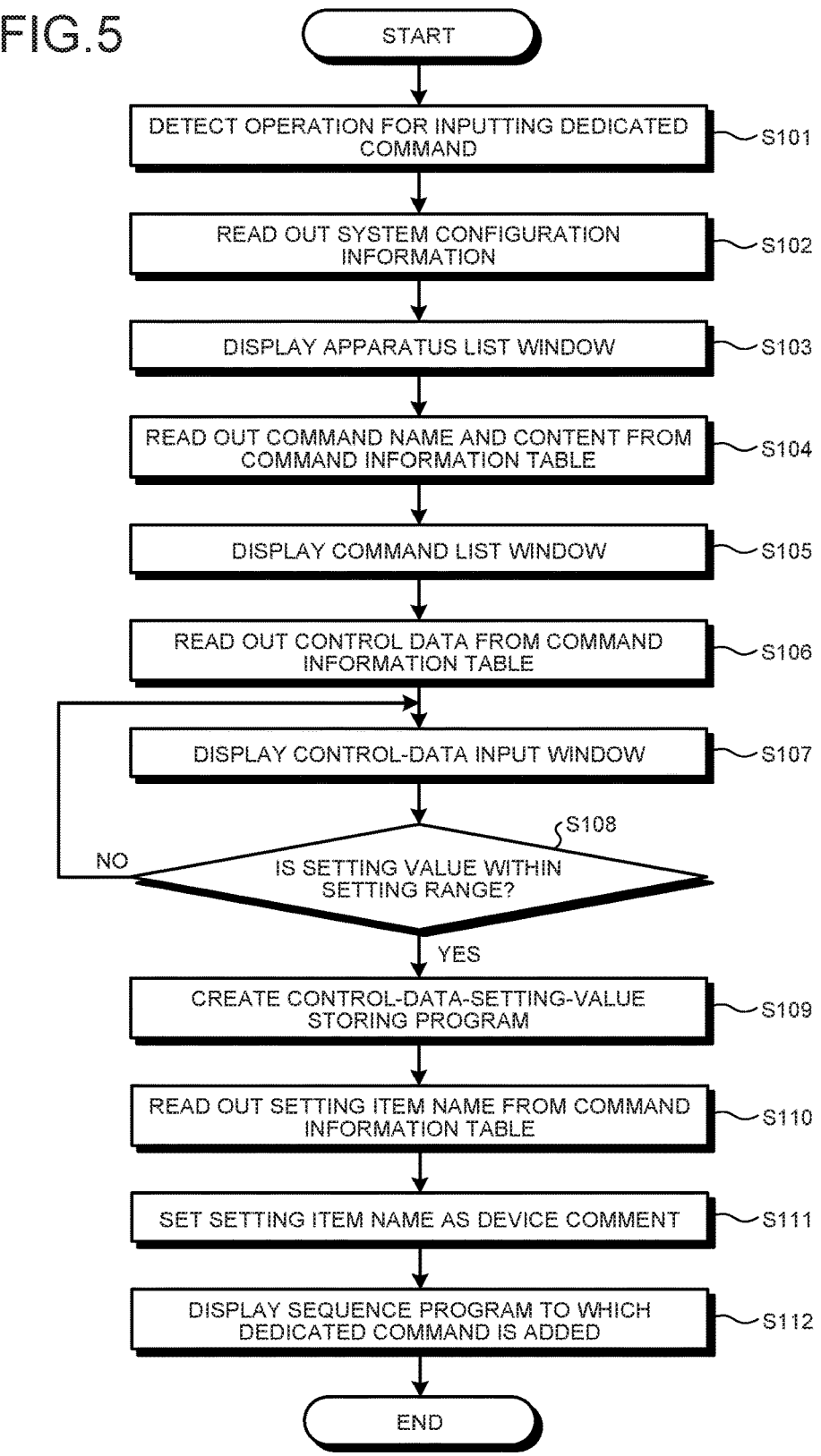
FIG. 5 is a flowchart for explaining a flow of processing at the time when operation for inputting a dedicated command is performed on a sequence-program creation screen.
Figure 6:
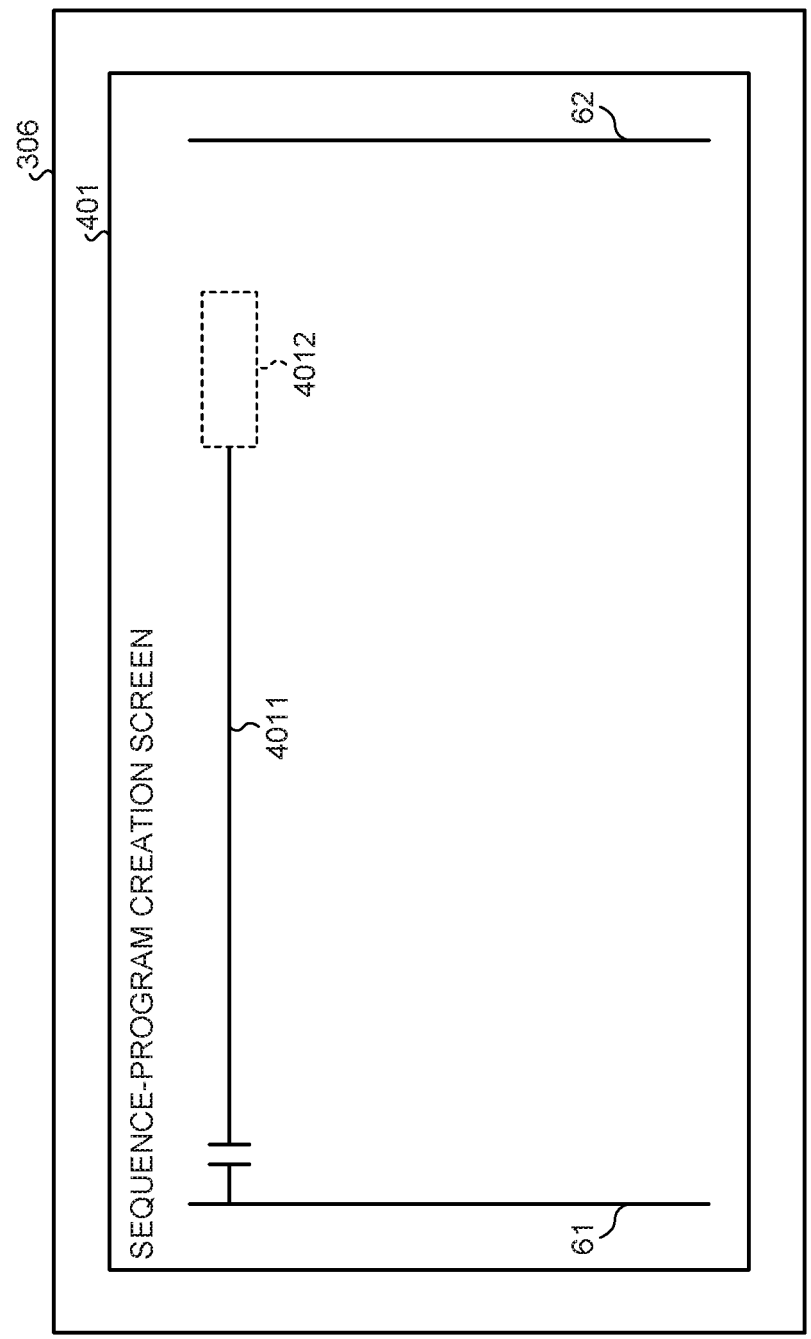
FIG. 6 is a diagram showing an example of the sequence-program creation screen.

FIG. 5 is a flowchart for explaining a flow of processing at the time when operation for inputting a dedicated command is performed on the sequence-program creation screen. The screen display section 201 detects that operation for inputting a dedicated command is performed on a sequence-program creation screen 401 that the editor section 203 causes the display section 306 to display (step S101). FIG. 6 is a diagram showing an example of the sequence-program creation screen. The screen display section 201 detects the operation for inputting a dedicated command performed on the input section 305 in a state in which a cursor 4012 is placed on a rung 4011 to which a dedicated command is desired to be input. Note that a rung in a ladder program is a circuit from a contact connected to a left bus to an output or a command connected to a right bus (a beam-like portion that connects the buses). However, the rung 4011 shown in FIG. 6 shows a state halfway in creation. Therefore, the rung 4011 is connected to a left bus 61 but is not connected to a right bus 62. The circuit is not completed.

Figure 7:
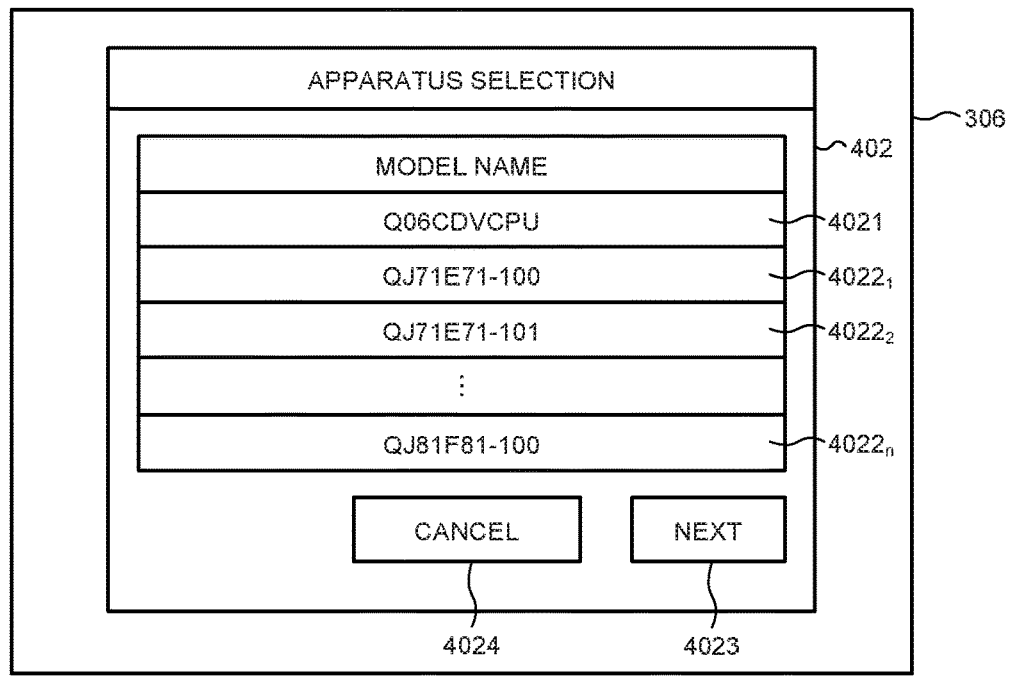
FIG. 7 is a diagram showing an example of an apparatus list window.

When the operation for inputting a dedicated command is performed by the operator, the screen display section 201 acquires information concerning the programmable logic controller 101 and the extension units $102_1$, $102_2$, . . . , and $102_n$, through the communication I/F 309 and the transmission line 10 (step S102). That is, the screen display section 201 reads out and acquires configuration information of the control system 500 from the programmable logic controller 101. The screen display section 201, which has acquired the information concerning the programmable logic controller 101 and the extension units $102_1$, $102_2$, . . . , and $102_n$, causes the display section 306 to display an apparatus list window 402 (step S103). FIG. 7 is a diagram showing an example of the apparatus list window. On the apparatus list window 402, a model number 4021 of the programmable logic controller 101, model numbers $4022_1$, $4022_2$, . . . , and $4022_n$ of the extension units $102_1$, $102_2$, . . . , and $102_n$, a "Next" button 4023, and a "Cancel" button 4024 are displayed.

Figure 8:
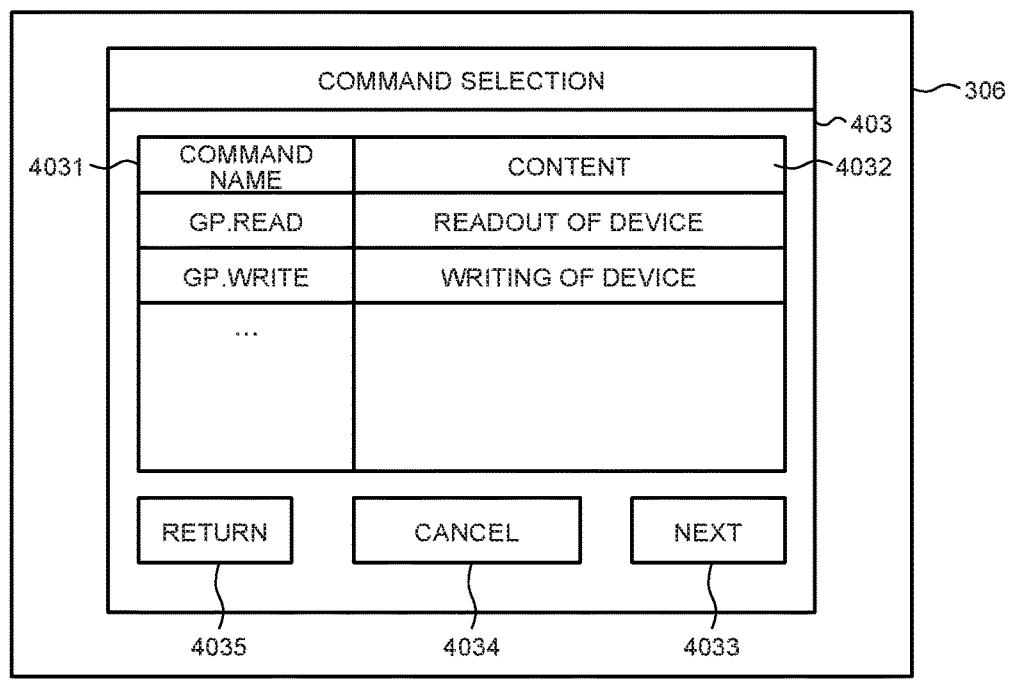
FIG. 8 is a diagram showing an example of a command list window.

When detecting that operation for pressing the "Next" button 4023 is performed by the operator in a state in which any one of the model number 4021 of the programmable logic controller 101 and the model numbers $4022_1$, $4022_2$, . . . , and $4022_n$ of the extension units $102_1$, $102_2$, . . . , and $102_n$ is selected on the apparatus list window 402, the screen display section 201 reads out information stored in the columns of the command name 30 and the content 31 of the table with referring to the command information table corresponding to the apparatus, the model number of which is selected, among the command information table $202_1$ to $202_m$ (step S104). Thereafter, the screen display section 201 causes the display section 306 to display a command list window 403 on the basis of information stored in the columns of the command name 30 and the content 31 (step S105). That is, the screen display section 201 functions as dedicated-command-information reading out unit for reading out, from the storing section 304, dedicated command information of a dedicated command executable in the programmable logic controller 101 or the extension units $102_1$, $102_2$, . . . , and $102_n$ configuring the control system 500. Furthermore, the screen display section 201 functions as dedicated-command-list displaying unit for displaying, with the command list window 403, a command name of a dedicated command in list on the display section 306. FIG. 8 is a diagram showing an example of the command list window. In the command list window 403, information stored in the column of the command name 30 of the command information table 202 is displayed in a column of a command name 4031, and information stored in the column of the content 31 of the command information table 202 is displayed in a column of content 4032. A "Next" button 4033, a "Cancel" button 4034, and a "Return" button 4035 are displayed on the command list window 403.

Note that, when detecting that operation for pressing the "Cancel" button 4024 is performed by the operator on the apparatus list window 402, the screen display section 201 stops processing for inputting a dedicated command. However, to facilitate understanding of the processing for inputting a dedicated command, illustration on the flowchart of FIG. 5 is omitted concerning this operation.

When detecting that operation for pressing the "Next" button 4033 is performed by the operator on the command list window 403 in a state in which the operator selects any one of dedicated commands, the screen display section 201 reads out, referring to the command information table 202, information stored in the columns of the control data $32_1$, $32_2$, . . . of the selected dedicated command (step S106). Thereafter, the screen display section 201 causes the display section 306 to display a control-data input window 404 on the basis of information stored in the columns of the control data $32_1$, $32_2$, . . . . (step S107). That is, the screen display section 201 functions as item-name acquiring unit for acquiring an item name by reading out, concerning a dedicated command executable by the programmable logic controller 101 or the extension units $102_1$, $102_2$, . . . , and $102n$ configuring the control system 500, from the storing section 304, dedicated command information including an item name, which represents a meaning of control data used for executing a dedicated command, and a command name.

Figure 9:
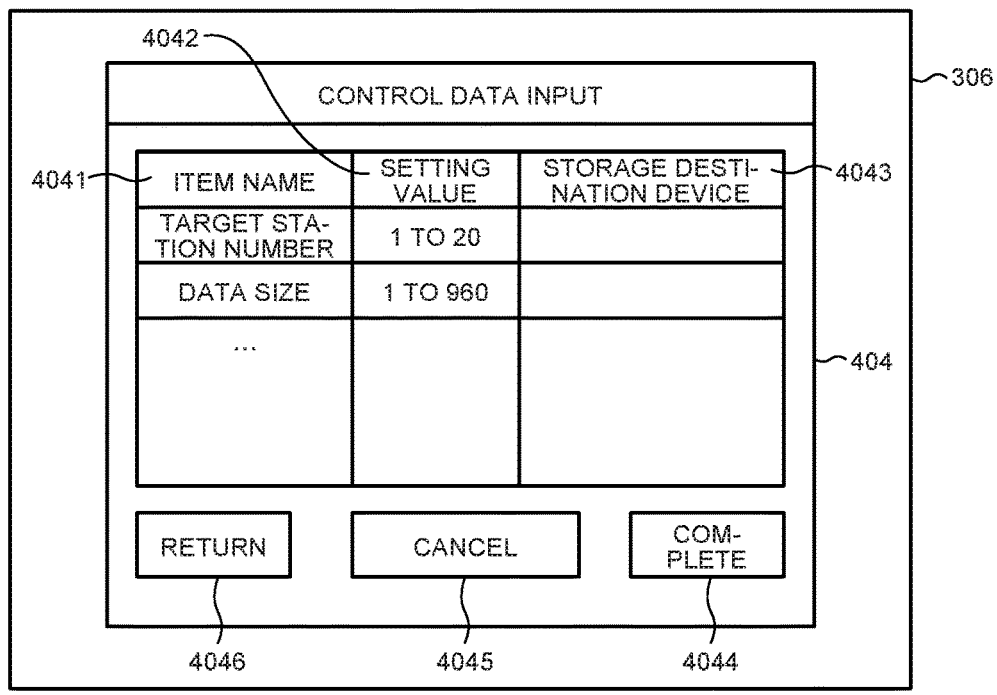
FIG. 9 is a diagram showing an example of a control-data input window.

FIG. 9 is a diagram showing an example of the control-data input window. The control-data input window 404 includes an item name 4041, a setting-value input column 4042, and a storage-destination-device input column 4043.

In the column of the item name 4041, information stored in the columns of the item names $32a_1$, $32a_2$, . . . of the command information table 202 is displayed. In the column of the setting value 4042, information stored in the columns of the setting ranges $32b_1$, $32b_2$, . . . of the command information table 202 is displayed. The column of the storage-destination-device input column 4043 is displayed as an empty column. A "Complete" button 4044, a "Cancel" button 4045, and a "Return" button 4046 are displayed on the control-data input window 404. Note that the engineering tool software 307 includes information indicating how many control data are required by dedicated commands. Therefore, the screen display section 201 causes, referring to this information, the display section 306 to display the control-data input window 404 having the number of rows same as the number of required control data.

Note that, when detecting that operation for pressing the "Cancel" button 4034 is performed by the operator on the command list window 403, the screen display section 201 stops the processing for inputting a dedicated command. When detecting that operation for pressing the "Return" button 4035 is performed by the operator on the command list window 403, the screen display section 201 displays the apparatus list window 402. However, to facilitate understanding of the processing for inputting a dedicated command, illustration on the flowchart of FIG. 5 is omitted concerning this operation.

When detecting that a setting value and a device name are input to the setting-value input column 4042 and the storage-destination-device input column 4043 of the control-data input window 404 and the "Complete" button 4044 is pressed, the screen display section 201 determines whether to accept the value input to the setting-value input column 4042 (step S108). Specifically, if the value input to the setting-value input space 4042 is within ranges of the setting ranges $32b_1$, $32b_2$, . . . (Yes at step S108), the screen display section 201 accepts the input value. If the input value is outside the ranges (No at step S108), the screen display section 201 rejects the input value.

Figure 10:
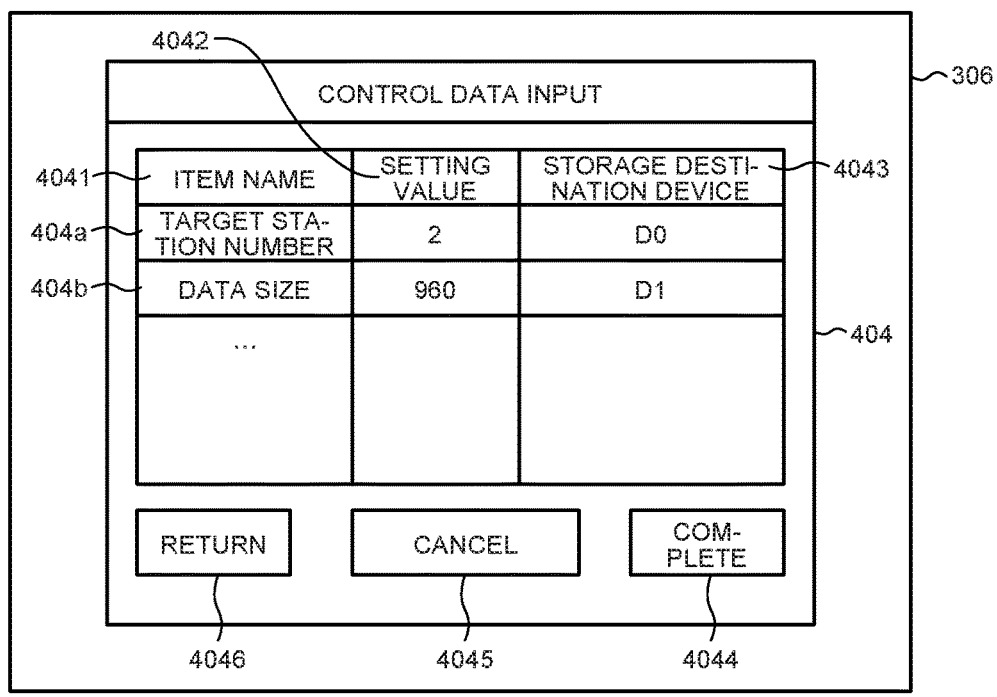
FIG. 10 is a diagram showing an example of a control-data input window to which setting values and storage destination devices are already input.

FIG. 10 is a diagram showing an example of the control-data input window to which setting values and storage destination devices are already input. In both of the setting-value input columns 4042 of a record 404a, the item name 4041 of which is a "target station number", and a record 404b, the item name 4041 of which is a "data size", values within the ranges set in the setting ranges $32b_1$ and $32b_2$ of the command information table 202 are input. Therefore, when the completion button 4044 is pressed, the screen display section 201 accepts the value input to the setting value 4042. On the other hand, when the value input to the setting-value input column 4042 is outside the ranges set in the setting ranges $32 b_1$ and $32b_2$ of the command information table 202, the screen display section 201 does not accept the input value even if the "Complete" button 4044 is pressed and requests a re-input of a value. For example, the process returns to step 5107 and the screen display section 201 causes the display section 306 to display the control-data input window 404 again.

Note that, when detecting that operation for pressing the "Cancel" button 4045 is performed by the operator on the control-data input window 404, the screen display section 201 stops the processing for inputting a dedicated command. When detecting that operation for pressing the "Return" button 4046 is performed by the operator on the control-data input window 404, the screen display section 201 displays the command list window 403. However, to facilitate understanding of the processing for inputting a dedicated command, illustration on the flowchart of FIG. 5 is omitted concerning these operations.

When the control-data input window 404 is displayed on the display section 306, information stored in the setting ranges $32b_1$, $32b_2$, . . . of the command information table 202 is default-displayed in the column of the setting value input column 4042. Consequently, it is possible to prevent a situation in which the operator sets a value outside the setting ranges and an error occurs when the sequence program is executed.

When accepting the value input to the setting-value input column 4042, the screen display section 201 outputs the value input to the control-data input window 404 to the editor section 203 and causes the editor section 203 to create a block of a program for storing a setting value of control data (step S109). The screen display section 201 reads out the information stored in the columns of the control data $32_1$, $32_2$, . . . of the dedicated command selected at step S106 (step S110) and causes the editor section 203 to set the information as a device comment in the sequence program in which the setting value of the control data is stored (step S111). Thereafter, the screen display section 201 sends an instruction to the editor section 203 and causes the editor section 203 to display, on the sequence-program creation screen 401, the block of the program for storing the setting value of the control data the sequence program to which the block of the program for storing the setting value of the control data and a dedicated command are added (step S112).

Figure 11:
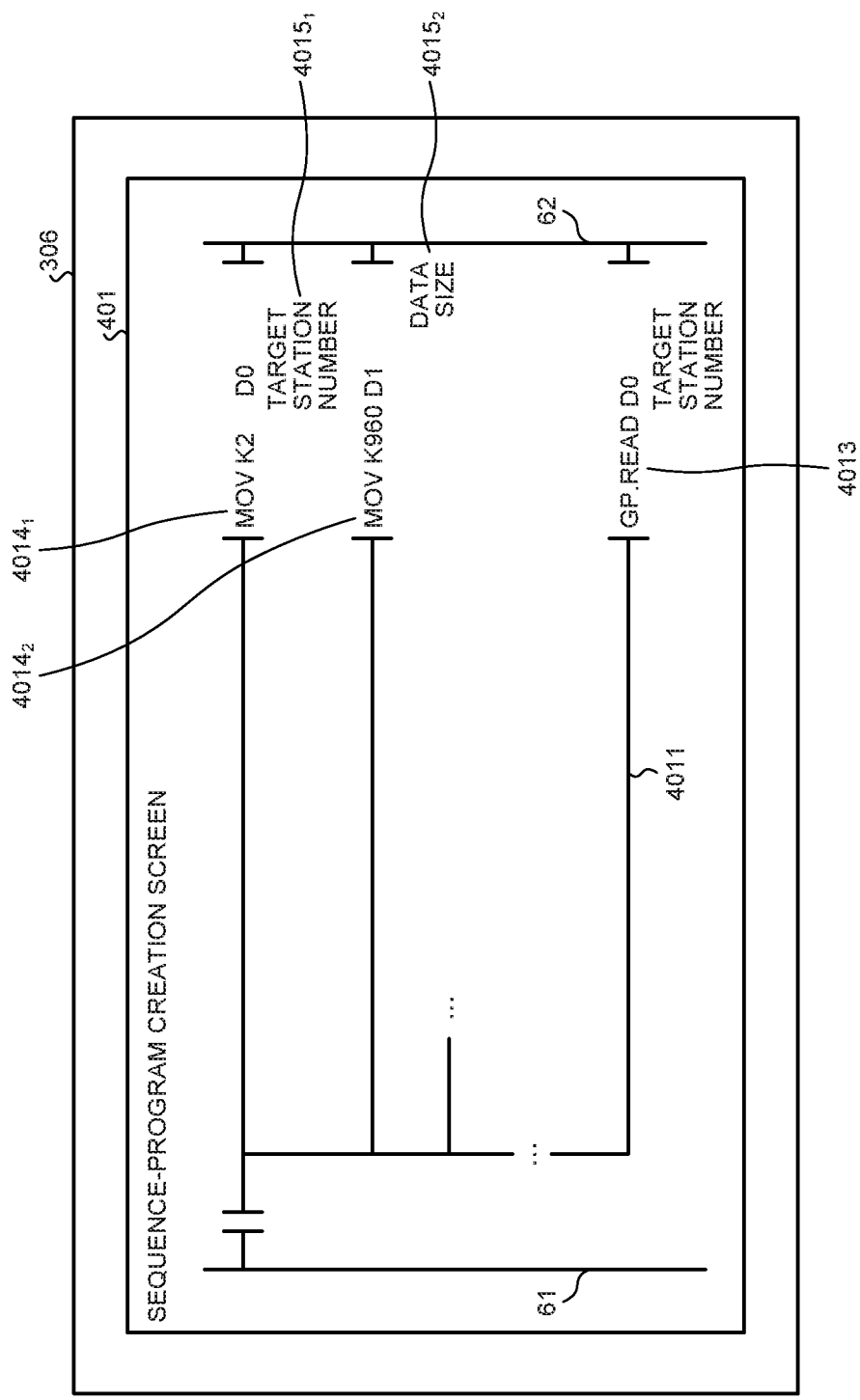
FIG. 11 is a diagram showing an example of a sequence program to which a dedicated command is added.

FIG. 11 is a diagram showing an example of the sequence program to which a dedicated command is added. A dedicated command 4013 is added to the rung 4011 on which the cursor 4012 is placed when the operation for adding a dedicated command is started. The dedicated command 4013 is connected to the right bus 62. The circuit between the left bus 61 and the right bus 62 is generated. "D0" of "GP.READ D0" means that readout is started from D0 among devices included in the programmable logic controller 101. That is, "D0" of "GP.READ D0" indicates that, in executing the dedicated command 4013 (GP.READ), value stored in the devices D0 are is necessary as control data.

The programmable logic controller 101 and the extension units $102_1$, $102_2$, . . . , and $102_n$ hold information indicating how many control data are necessary for dedicated commands executable by the programmable logic controller 101 and the extension units $102_1$, $102_2$, . . . , and $102_n$. During execution of a dedicated command, the programmable logic controller 101 and the extension units $102_1$, $102_2$, . . . , and $102_n$ read out control data equivalent to the necessary number from the devices. For example, when the dedicated command 4013 shown in FIG. 11 is a dedicated command requiring three control data and the programmable logic controller 101 executes the dedicated command 4013, the programmable logic controller 101 reads out values from three devices D0, D1, and D2.

In the sequence program added by the editor section 203, commands $4014_1$, $4014_2$, . . . for storing control data in the devices D0, D1, . . . are included before the dedicated command 4013 (on the upper side in the sequence-program creation screen 401). Note that "MOV" of the command $4014_1$ for storing control data means a transfer command, "K2" means a numerical value 2 in a decimal digit, and "D0" means that a storage destination device is D0. Similarly, "MOV" of the command $4014_2$ for storing control data means a transfer command, "K960" means a numerical value 960 in a decimal digit, and "D1" means that a storage destination device is D1. Therefore, the operator does not need to add the commands $4014_1$, $4014_2$, . . . in work separate from the input work for a dedicated command.

Device comments $4015_1$, $4015_2$, . . . are automatically added to the commands $4014_1$, $4014_2$, . . . for storing control data by the processing at step S112. That is, at a point when the screen display section 201 accepts a setting value of control data, the screen creating section 201 sends an instruction to the editor section 203 and adds the device comments $4015_1$, $4015_2$, . . . to the devices D0, D1, . . . . The device comments $4015_1$, $4015_2$, . . . are character strings included in the command information table 202 as item names $32a_1$, $32a_2$, . . . . The item names $32a_1$, $32a_2$, . . . are set by the creator of the command information table 202 as character strings representing a meaning of the control data. Therefore, by adding the device comments $4015_1$, $4015_2$, . . . , the operator can easily understand that the devices D0, D1, . . . are devices for storage of control data. Convenience is improved.

In a general engineering tool, an operator himself/herself has to perform work for describing, in a former stage than a dedicated command, a command for storing control data in a device. On the other hand, in the engineering tool 100 according to this embodiment, if the command information table 202 including character strings representing a meaning of control data in the columns of the item names $32a_1$, $32a_2$, . . . is prepared in advance for each of apparatuses that are likely to be applied to the control system 500. When a dedicated command is input, commands for storing the command data in devices and device commends displayed together with the commands are added to the sequence program by the engineering tool 100 on the basis of the command information table 202. Therefore, it is possible to prevent an error of a setting value and an error of a program in which setting is omitted from occurring when the dedicated command is described in the sequence program.

Note that the control data $32_1$, $32_2$, . . . may not be included in the dedicated command information. In this case, the device comments cannot be automatically added. However, when detecting operation for inputting a dedicated command, the screen display section 201 can display the command list window to display all executable dedicated commands in list. Therefore, it is possible to surely support the operator when inputting a dedicated command. It is possible to facilitate creation work for the sequence program.

The engineering tool 100 according to this embodiment is capable of not only automatically adding device comments when dedicated commands of the extension units $102_1$, $102_2$, . . . , and $102_n$ are input but also automatically adding a device comment when a dedicated command of the programmable logic controller (the CPU unit) 101 is input.

In this way, the engineering tool 100 according to this embodiment displays all dedicated commands in list executable by the programmable logic controller 101 and the extension units $102_1$, $102_2$, . . . , and $102_n$ applied to the control system 500, and adds a dedicated command selected out of the displayed dedicated commands in list to the sequence program. Therefore, it is possible to surely support the operator when inputting a dedicated command. It is possible to facilitate creation work for the sequence program.

The engineering tool 100 according to this embodiment automatically clearly indicates that the devices in the programmable controller 101 are used as devices for control data. Therefore, it is possible to prevent the devices used as the devices for control data from being used in other uses by mistake. The engineering tool 100 according to this embodiment creates blocks of a program for storing control data in the devices and at the same time adds device comments. Therefore, setting omission of the device comments is unlikely. Convenience for the operator is improved.

INDUSTRIAL APPLICABILITY

As explained above, the sequence-program-creation supporting apparatus according to the present invention is useful in that, when a dedicated command is input, it is unnecessary to manually create a program for storing setting values in devices of a programmable logic controller and separately set device comments. Labor of an operator can be reduced.

REFERENCE SIGNS LIST 10 transmission line
30 command name
31, 4032 content
$32_1$, $32_2$ control data
$32a_1$, $32a_2$ item name
$32b_1$, $32b_2$ setting range
61 left bus
62 right bus
100 engineering tool
101 programmable logic controller
$102_1$, $102_2$, . . . , $102_n$ extension unit
201 screen display section
202, $202_1$, $202_2$, $202_m$ command information table
203 editor section
300 computer
301 CPU
302 RAM
303 ROM
304 storing section
305 input section
306 display section
307 engineering tool software
309 communication I/F
401 sequence-program creation screen
402 apparatus list window
403 command list window
404 control-data input window
404a, 404b record
500 control system
4011 rung
4012 cursor
4013 dedicated command
$4014_1$, $4014_2$ command for storing control data
$4015_1$, $4015_2$ device comment
4021, $4022_1$, $4022_2$, . . . , $4022_k$ model number
4023, 4033 "Next" button
4024, 4034, 4045 "Cancel" button
4031 command name
4035, 4046 "Return" button
4041 item name
4042 setting-value input column
4043 storage-destination-device input column
4044 "Complete" button

The invention claimed is:

1. A sequence-program-creation supporting apparatus that supports work for creating a sequence program that a programmable logic controller configuring a control system is caused to execute, the sequence-program-creation supporting apparatus comprising:

a processor configured to execute engineering tool software; and a memory configured to store dedicated command information including a command name of a dedicated command, which is executable by the programmable logic controller configuring the control system, for each of models of the programmable logic controller, wherein the memory is further configured to store the engineering tool software which, when executed by the processor, results in performance of operations comprising:

reading out, when detecting that an operation for inputting the dedicated command is performed on a sequence-program creation screen, from the memory, the dedicated command information corresponding to one of the models of the programmable logic controller configuring the control system;

displaying command names of dedicated commands in a list on the basis of the dedicated command information read out from the memory;

creating, when detecting that an operation for selecting one of the command names of the dedicated commands displayed in the list is performed, a block of a program for storing, in a device, control data for executing the dedicated command, the command name of which is selected; and adding the block of the program created by the creating and the dedicated command, the command name of which is selected, to the sequence program on the sequence-program creation screen.

2. The sequence-program-creation supporting apparatus according to claim 1, wherein the memory is further configured to store, for each model of an extension unit configuring the control system in conjunction with the programmable logic controller, dedicated command information including a command name of a dedicated command executable by the extension unit, and the processor is configured to read out, from the memory, the dedicated command information corresponding to one of the programmable logic controller and the extension unit configuring the control system that is selected by operator operation.

3. The sequence-program-creation supporting apparatus according to claim 2, wherein the dedicated command information includes an item name representing a meaning of control data used for executing the dedicated command, the processor is further configured to acquire, when detecting that the operation for selecting one of the command names of the dedicated commands displayed in the list is performed, the item name corresponding to the dedicated command, the command name of which is selected, by reading out the dedicated command information from the memory; and the processor is further configured to:

add, as a device comment, the acquired item name to a device name included in the block of the program, the device name identifying the device, and create the block of the program for storing, in the device, the control data for executing the dedicated command, the command name of which is selected.

4. The sequence-program-creation supporting apparatus according to claim 1, wherein the processor is configured to display a screen including a setting-value input column for inputting a setting value of the control data and a storage-destination-device input column for designating a device into which the setting value is stored and to create the block of the program on the basis of values input to the setting-value input column and the storage-destination-device input column by a user.

5. A sequence-program-creation supporting apparatus that supports work for creating a sequence program that a programmable logic controller configuring a control system is caused to execute, the sequence-program-creation supporting apparatus comprising:

a processor configured to execute engineering tool software; and a memory configured to store dedicated command information associating a command name of a dedicated command and an item name representing a meaning of control data used for executing the dedicated command for each of models of the programmable logic controller configuring the control system, wherein the memory is further configured to store the engineering tool software which, when executed by the processor, results in performance of operations comprising:

acquiring, when detecting that an operation for inputting the dedicated command is performed on a sequence-program creation screen, the item name corresponding to the dedicated command, the operation for the inputting of which is performed, from the memory by reading out the dedicated command information from the memory;

creating a block of a program for storing, in a device, control data for executing the dedicated command, the operation for the inputting of which is performed;

adding, as a device comment, the acquired item name to a device name included in the block of the created program, the device name identifying the device; and adding the block of the program, having the device comment added to the device name, and the dedicated command, the operation for the inputting of which is performed, to the sequence program on the sequence-program creation screen.

6. The sequence-program-creation supporting apparatus according to claim 5, wherein the memory is further configured to store, for each model of an extension unit configuring the control system in conjunction with the programmable logic controller, dedicated command information associating a command name of a dedicated command executable by the extension unit, and an item name representing a meaning of control data used for executing the dedicated command, and the processor is configured to acquire, when an operation for inputting the dedicated command executable by the extension unit is performed by an operator, the item name corresponding to the dedicated command, the operation for the inputting of which is performed.

7. The sequence-program-creation supporting apparatus according to claim 6, wherein the dedicated command information includes a setting range of the control data, and the processor is configured to, when a value outside the setting range is input as a setting value of the control data, reject the input value as the setting value of the control data.

* * * * *